US012576933B2

(12) United States Patent
Kato et al.

(10) Patent No.: US 12,576,933 B2
(45) Date of Patent: Mar. 17, 2026

(54) SCREEN FOR SADDLE-RIDING VEHICLE

(71) Applicant: KAWASAKI MOTORS, LTD., Hyogo (JP)

(72) Inventors: Hirotaka Kato, Hyogo (JP); Kohei Akita, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 844 days.

(21) Appl. No.: 17/868,022

(22) Filed: Jul. 19, 2022

(65) Prior Publication Data

US 2024/0025505 A1    Jan. 25, 2024

(51) Int. Cl.
B62J 17/10        (2020.01)
B62K 11/02        (2006.01)

(52) U.S. Cl.
CPC .............. B62J 17/10 (2020.02); B62K 11/02 (2013.01)

(58) Field of Classification Search
CPC ........... B62J 17/10; B62K 11/02; B60K 11/08
USPC .................................................... 280/288.4
See application file for complete search history.

(56) References Cited

U.S. PATENT DOCUMENTS

| | | | | |
|---|---|---|---|---|
| 5,984,035 A | * | 11/1999 | Katoh ...................... | B62J 23/00 |
| | | | | 180/68.1 |
| 7,762,367 B2 | * | 7/2010 | Yamaguchi .............. | B62J 41/00 |
| | | | | 165/149 |
| 8,671,892 B2 | * | 3/2014 | Yamanishi ............. | B60K 11/08 |
| | | | | 123/41.01 |
| 9,751,393 B2 | * | 9/2017 | Nakata ................... | B60K 13/04 |
| 9,988,121 B2 | * | 6/2018 | Inomata ................ | B62K 11/04 |
| 10,392,071 B2 | * | 8/2019 | Matsuo .................. | B60K 11/04 |
| 2007/0246279 A1 | * | 10/2007 | Miura ..................... | F28F 9/002 |
| | | | | 180/68.4 |
| 2016/0264201 A1 | * | 9/2016 | Inomata .................. | B60T 8/176 |

* cited by examiner

*Primary Examiner* — Valentin Neacsu
*Assistant Examiner* — Michael R Stabley
(74) *Attorney, Agent, or Firm* — GREENBLUM & BERNSTEIN, P.L.C.

(57)        ABSTRACT
A screen is attached to the saddle riding vehicle to face forward with respect to the saddle-riding vehicle, and permits passage of incoming air while preventing passage of foreign objects. The screen includes: a plurality of vertical fins extending in a vertical direction and arranged next to one another in a vehicle widthwise direction; and a lower fin connecting lower ends of the vertical fins and inclined downward towards a front. A first vertical fin located in an outermost position has a lower portion extending in an inwardly inclined manner in the vehicle widthwise direction towards a lower end thereof, and a front end portion extending in a downwardly inclined manner towards an outer end of the lower fin in the vehicle widthwise direction. The lower end of the first vertical fin and the outer end of the lower fin are connected by a connecting part.

12 Claims, 4 Drawing Sheets

SCREEN FOR SADDLE-RIDING VEHICLE

FIELD OF THE INVENTION

The present disclosure relates to a screen which is attached to a saddle riding vehicle at such a position that the screen faces forward with respect to the vehicle, and permits passage of incoming air but prevents passage of foreign objects.

BACKGROUND OF THE INVENTION

For example, some saddle riding vehicles such as off-road motorcycles include a screen for introducing air to the radiator. Such a screen may have a lower fin in the lower portion of the screen in order to enhance the wind introducing effect and prevent mud splashed by the front wheel from attaching to the surface of the radiator core.

The lower fin is required to be robust because mud splashed by the front wheel collides with the lower fin. Increasing the thickness of the lower fin may cause a problem of interference with other components and may also result in weight increase. Providing the lower fin with ribs may make the structure complicated and may also result in weight increase.

SUMMARY OF THE INVENTION

The present disclosure provides a screen for a saddle riding vehicle in which the lower fin can have increased rigidity.

The present disclosure provides a screen which is attached to a saddle riding vehicle at such a position that the screen faces forward with respect to the saddle riding vehicle, and permits passage of incoming air while preventing passage of foreign objects, the screen including: a plurality of vertical fins extending in a vertical direction and arranged next to one another in a vehicle widthwise direction, and a lower fin connecting lower ends of the vertical fins and inclined downward as the lower fin extends forward. A first vertical fin which is located in an outermost position in the vehicle widthwise direction in an attached state of the screen to a vehicle body has a lower portion extending in an inwardly inclined manner in the vehicle widthwise direction as the lower portion extends to a lower end of the first vertical fin, and a front end portion extending in a downwardly inclined manner as the front end portion extends to an outer end of the lower fin in the vehicle widthwise direction. The lower end of the first vertical fin and the outer end of the lower fin are connected by a connecting part.

According to this configuration, the lower fin is inclined downward as the lower fin extends forward, and the lower portion of the first vertical fin which extends in an inwardly inclined manner in vehicle widthwise direction as the lower portion extends to the lower end is connected to the outer end portion of the lower fin which extends in a downwardly inclined manner as the outer end portion extends to the outer end in the vehicle widthwise direction through the connecting part. Thus, the connecting part has an increased size as compared with that in the case where the lower portion of the first vertical fin extending in the vertical direction is connected to the outer end portion of the lower fin extending in the vehicle widthwise direction, at the right angle. As a result, the thickness of the lower fin can be increased, and the rigidity of the lower fin can be increased without providing the lower fin with ribs.

In addition, the lower fin enhances the guiding effect for incoming air. The downward inclination of the outer portion of the front edge portion of the lower fin in the vehicle widthwise direction can facilitate introduction of incoming air from the outer side in the vehicle widthwise direction, so that the wind introducing effect can be further enhanced. Even though the outer portion of the lower fin in the vehicle widthwise direction extends downward, the connecting part does not project outward in the vehicle widthwise direction because the outermost, first vertical fin is inclined inward so that the connecting part can be connected at an inner position with respect to the outermost first vertical fin.

The present disclosure encompasses any combination of at least two features disclosed in the claims and/or the specification and/or the drawings. In particular, any combination of two or more of the appended claims should be equally construed as included within the scope of the present disclosure.

BRIEF DESCRIPTION OF THE DRAWINGS

The present disclosure will be more clearly understood from the following description of preferred embodiments thereof, when taken in conjunction with the accompanying drawings. However, the embodiments and the drawings are given only for the purpose of illustration and explanation, and are not to be taken as limiting the scope of the present disclosure in any way whatsoever, which scope is to be determined by the appended claims. In the accompanying drawings, like reference numerals are used to denote like or corresponding parts throughout the several views. In the figures:

DESCRIPTION OF THE EMBODIMENTS

Figure 1:
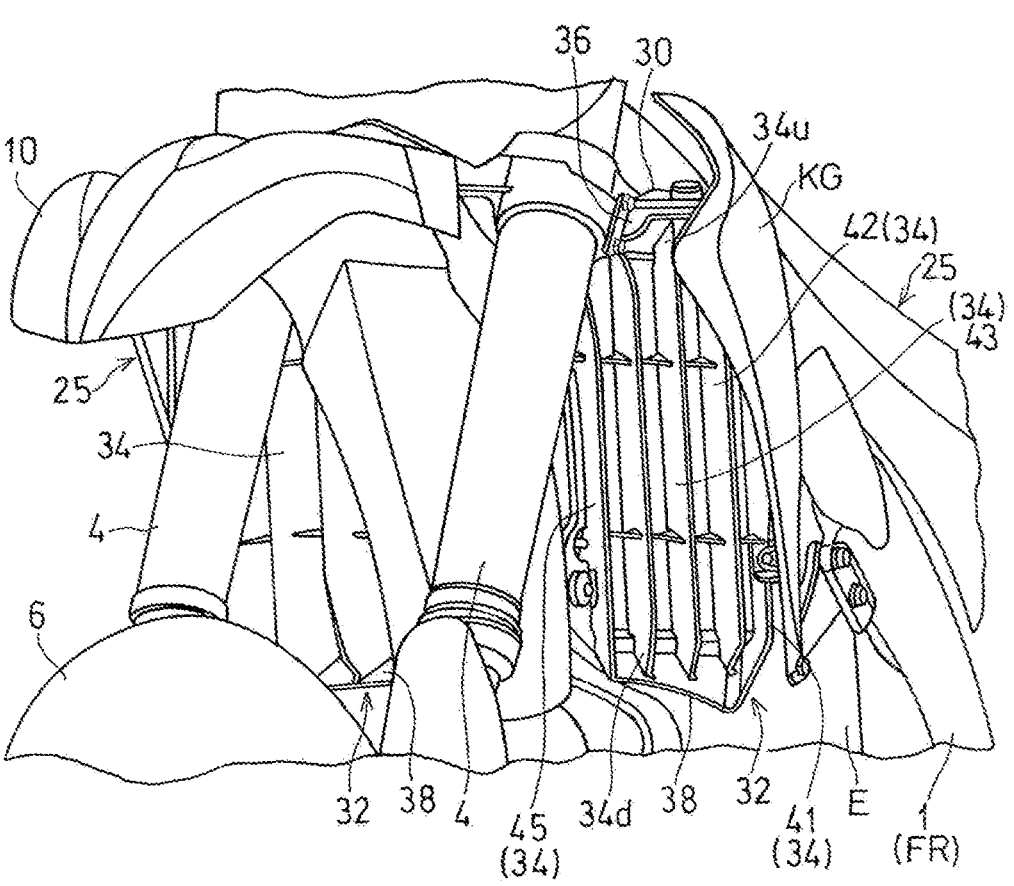
FIG. 1 is a perspective view showing a front part of a motorcycle that is a type of saddle riding vehicle including a screen according to a first embodiment of the present disclosure in an enlarged manner.

Hereinafter, a preferable embodiment of the present disclosure will be described with reference to the drawings. FIG. 1 is a perspective view showing a front part of a motorcycle that is a type of saddle riding vehicle including a screen according to a first embodiment of the present disclosure. As used herein, the "left" and "right" correspond to the "left" and "right" when viewed by a driver riding on the vehicle, respectively. That is, the left-to-right direction coincides with the vehicle widthwise direction. The "front" and "rear" correspond to the "front" and "rear" in the travelling direction of the vehicle. That is, the longitudinal direction of the vehicle body coincides with the front-to-rear direction of the vehicle. The inner side of the vehicle body in the vehicle widthwise direction means a side closer to the center line of the vehicle body extending in the front-to-rear direction, and the outer side of the vehicle body in the in the vehicle widthwise direction means a side farther from the center line of the vehicle body.

The motorcycle of the present embodiment is an off-road vehicle for riding on unsurfaced roads. In particular, the motorcycle is a racing motorcycle. However, the motorcycle of the present disclosure is not limited to an off-road vehicle. The vehicle body frame FR of the motorcycle includes a main frame 1 which constitutes a front half of the motorcycle. The main frame 1 extends rearward and diagonally downward from a head pipe (not illustrated) at the front end. The head pipe supports a front fork 4. A front wheel 6 is supported by a lower end portion of the front fork 4, and a steering handlebar (not illustrated) is attached to an upper end portion of the front fork 4. A front fender 10 is disposed above the front wheel 6 and is fixed to the vehicle body frame FR. The front fender 10 blocks foreign objects such as mud splashed by the front wheel 6 toward a driver.

The motorcycle of the present embodiment includes a pair of left and right cowlings 25 which covers the vehicle body from opposite lateral sides. The cowlings 25 cover gaps between a seat (not illustrated) and the vehicle body frame FR from outer lateral sides. Each cowling 25 includes a knee grip part KG at the front end portion thereof to be held between the knees of a driver.

An engine E that is a drive power source is disposed rearward of the front wheel 6 and below the main frame 1, The engine E of the present disclosure is a liquid-cooled four-cylinder engine. The cooling liquid may be, for example, water. The engine E is not limited to a four-cylinder engine and may be a single-cylinder engine, a two-cylinder engine, a three-cylinder engine, a six-cylinder engine, or the like. A radiator 30 is disposed forward of the engine E and rearward of the front wheel 6. In particular, the radiator 30 is disposed rearward of the front fender 10 and forward of the engine E. The radiator 30 allows cooling water to flow through the radiator to dissipate heat by using incoming air.

Figure 2:
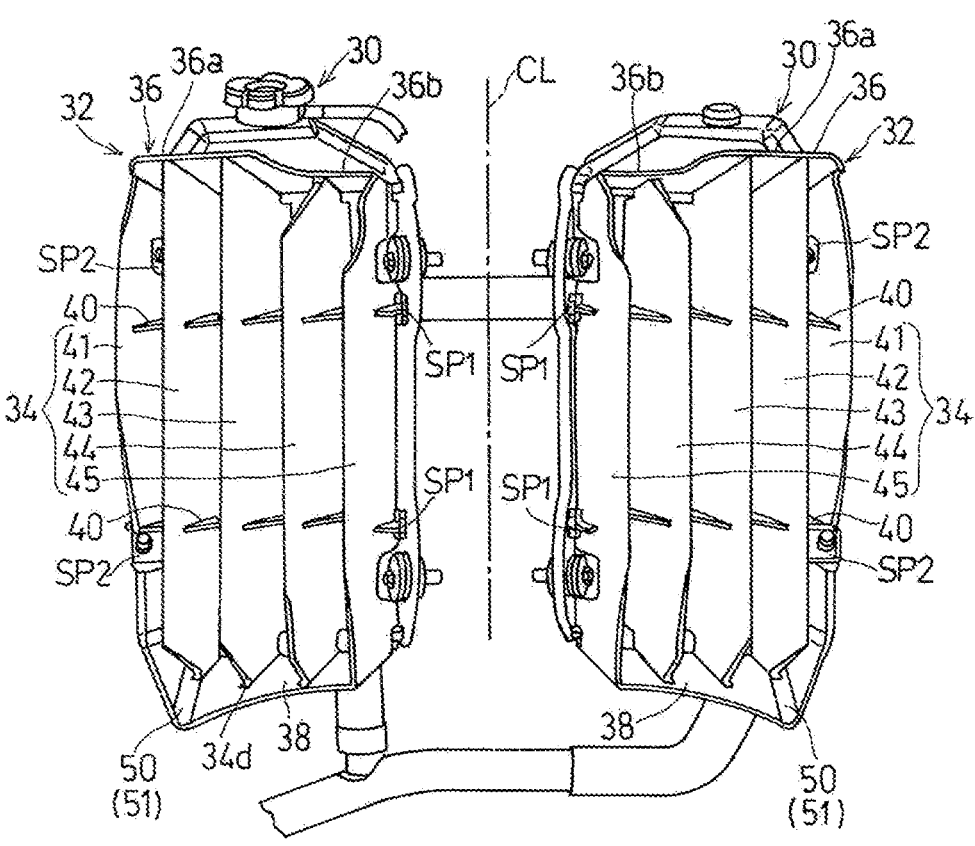
FIG. 2 is a front view showing the screen.

In the present embodiment, as shown in FIG. 2, two radiators 30 are disposed on opposite sides with respect to the center line CL of the vehicle body in the vehicle widthwise direction. As the radiator 30, however, it is possible to to use a single radiator having its longitudinal direction in the vehicle widthwise direction and extending in the vehicle widthwise direction across the center line CL of the vehicle body or a single radiator disposed on one side in the vehicle widthwise direction with respect to the center line CL of the vehicle body.

As shown in FIG. 1, the knee grip parts KG are arranged on the outer lateral sides with respect to the radiators 30. That is, the holding force applied by the knees of a driver is supported by the radiators 30.

A screen 32 is disposed forward of the radiator 30. The screen 32 according to the present disclosure is attached to the vehicle at such a position that the screen faces forward with respect to the vehicle, and permits passage of incoming air but prevents passage of foreign objects. The screen 32 according to the present disclosure guides incoming air to the radiator 30 and blocks foreign object toward the radiator 30.

As shown in FIG. 2, in the present embodiment, a screen 32 is disposed in front of each of the two radiators 30. That is, there are two screens 32 in the present embodiment. The two screens 32 on the left and right sides are symmetrical. Each screen 32 is supported by a radiator 30. In the present embodiment, the inner part of each screen 32 in the vehicle widthwise direction is inserted into and supported at two upper and lower first supported parts SP1 by a radiator 30, and the outer part of each screen 32 in the vehicle widthwise direction is bolted to and supported at two upper and lower second supported parts SP2 by a radiator 30.

The number and the shape of the screens 32 are not limited to those of the present embodiment. For example, there may be one screen 32, or three or more screens 32. The shapes of the screens 32 may be asymmetrical.

Each screen 32 includes: a plurality of vertical fins 34 extending in the vertical direction and arranged next to one another in the vehicle widthwise direction; an upper fin 36 connecting upper ends 34*u* of the vertical fins 34; and a lower fin 38 connecting lower ends 34*d* of the vertical fins 34. The screen 32 to of the present embodiment is made of a resin, and the fins 34, 36, 38 are integrally shaped by die molding.

The upper fin 36 has a flat-plate shape extending in the vehicle widthwise direction, and an outer portion 36*a* of the upper fin in the vehicle widthwise direction has a shape matching the shape of the cowling 25. Specifically, the outer portion 36*a* of the upper fin 36 in the vehicle widthwise direction which is shown in FIG. 2 has a larger length in the front-to-rear direction than that of an inner portion 36*b* of the upper fin in the vehicle widthwise direction. In other words, the outer portion 36*a* of the upper fin 36 in the vehicle widthwise direction projects forward with respect to the inner portion 36*b* in the vehicle widthwise direction.

Each of the vertical fins 34 has a flat-plate shape extending in the vertical direction. In the present embodiment, each screen 32 includes five vertical fins 34. As long as there are multiple vertical fins 34, the number of vertical fins is not limited to five. The vertical fins 34 are inclined inwardly in the vehicle widthwise direction as they extend to the rear, so that the radiator 30 cannot be seen through the screen 32 in a front view. Thus, the screen 32 can guide incoming air to the radiator 30 while blocking foreign objects such as mud toward the radiator 30.

In the following description, the vertical fins are referred to as first vertical fin 41, second vertical fin 42, third vertical fin 43, fourth vertical fin 44, and fifth vertical fin 45 starting from the outer side in the vehicle widthwise direction. That is, the first vertical fin 41 is the outermost vertical fin 34 in the vehicle widthwise direction; the second vertical fin 42 is the vertical fin 34 next to the first vertical fin 41 on the inner side in the vehicle widthwise direction; and the third vertical fin 43 is the vertical fin 34 next to the second vertical fin 42 on the inner side in the vehicle widthwise direction. In the same manner, the fourth vertical fin 44 is the vertical fin 34 next to the third vertical fin 43 on the inner side in the vehicle widthwise direction, and the fifth vertical fin 45 is the innermost vertical fin 34 next to the fourth vertical fin 44 on the inner side in the vehicle widthwise direction.

The outermost first vertical fin 41 in the vehicle widthwise direction in the attached state of the screen 32 to the vehicle body has a lower portion extending in an inwardly inclined manner in the vehicle widthwise direction as the lower portion extends to the lower end 34*d*. This makes it possible to prevent a leg of a driver at the knee grip part KG from being caught on the lower portion of the first vertical fin 41. In addition, the front edges of the lower portions of the vertical fins 34 are inclined rearward as the front edges extend downward. This facilitates exit of foreign objects such as mud from connecting parts between the vertical fins 34 and the lower fin 38. The structure of the connecting parts between the vertical fins 34 and the lower fin 38 is described later.

In the present embodiment, the front edges of the lower portions of all the vertical fins 41 to 45 are inclined rearward as the front edges extend downward. Alternatively, the front edge of the lower portion of at least one arbitrary vertical fin 34 may be inclined rearward as it extends downward. In the present embodiment, the front edges of the lower portions of the vertical fins 34 are inclined rearward at different inclination angles a (FIG. 3) among the vertical fins 41 to 45. Alternatively, they may be inclined at a same inclination angle. The inclination angle α is an angle of the front edge of the lower portion of a vertical fin 34 with respect to a horizontal line H extending in the front-to-rear direction to pass through the lower end of the front edge of that vertical fin 34 in a side view. Further, the front edges of the lower portions of the vertical fins 34 may not be inclined rearward as they extend downward.

The screen 32 includes a horizontal rib 40 connecting adjacent vertical fins 34. In the present embodiment, horizontal ribs 40 are arranged in an upper half and a lower half of the screen 32. That is, the horizontal ribs 40 are arranged between the individual vertical fins 41, 42, 43, 44, 45 in the upper half and the lower half, and the screen 32 includes eight horizontal ribs 40.

In the present embodiment, the lower horizontal ribs 40 are located at the same height as the lower first and second supported parts SP1, SP2. The upper horizontal ribs 40, on the other hand, are located at the same height as the upper first supported parts SP1. However, the positions and the number of the horizontal ribs 40 are not limited to those of the present example. The horizontal ribs 40 may be omitted.

The lower fin 38 has a flat-plate shape extending in the vehicle widthwise direction. The lower fin 38 can block foreign objects such as mud splashed from below and serve as a guide to enhance the wind introducing effect. The lower fin 38 is inclined downward as the lower fin extends forward. This allows foreign objects such as mud accumulating on the upper face of the lower fin 38 to exit downward and also enlarges the front opening of the screen 32, facilitating intake of incoming air.

The front end portion of the lower fin 38 extends in a downwardly inclined manner towards the outer end of the lower fin in the vehicle widthwise direction. This causes foreign objects on the inner part of the lower fin 38 to flow to the outer part of the lower fin 38. Further, the lower fin 38 is inclined downward and extends forward as the lower fin extends to the outer end in the vehicle widthwise direction. Thus, the foreign objects flowing toward the outer side with respect to the lower fin 38 is more likely to exit from the screen 32.

The lower end of the first vertical fin 41 and the outer end of the lower fin 38 are connected by a connecting part 50. That is, the connecting part 50 forms the first connecting part 51 which connects the lower end of the outermost first vertical fin 41 in the vehicle widthwise direction and the outer end of the lower fin 38. The connecting part 50 has a curved smooth surface without corners. That is, the lower end of the first vertical fin 41 and the outer end of the lower fin 38 are connected by the surface 51.

Thus, the first vertical fin 41 and the lower fin 38 are connected by the first connecting part 51 having the curved surface, so that the thickness of the lower fin 38 is suppressed, while the rigidity of the lower fin 38 is secured. In addition, the first connecting part 51 is arranged at the outer portion of the lower fin 38 at which the lower fin projects most forward, so that the first connecting part 51 has an increased size in the front-to-rear direction and thus has increased rigidity.

Figure 3:
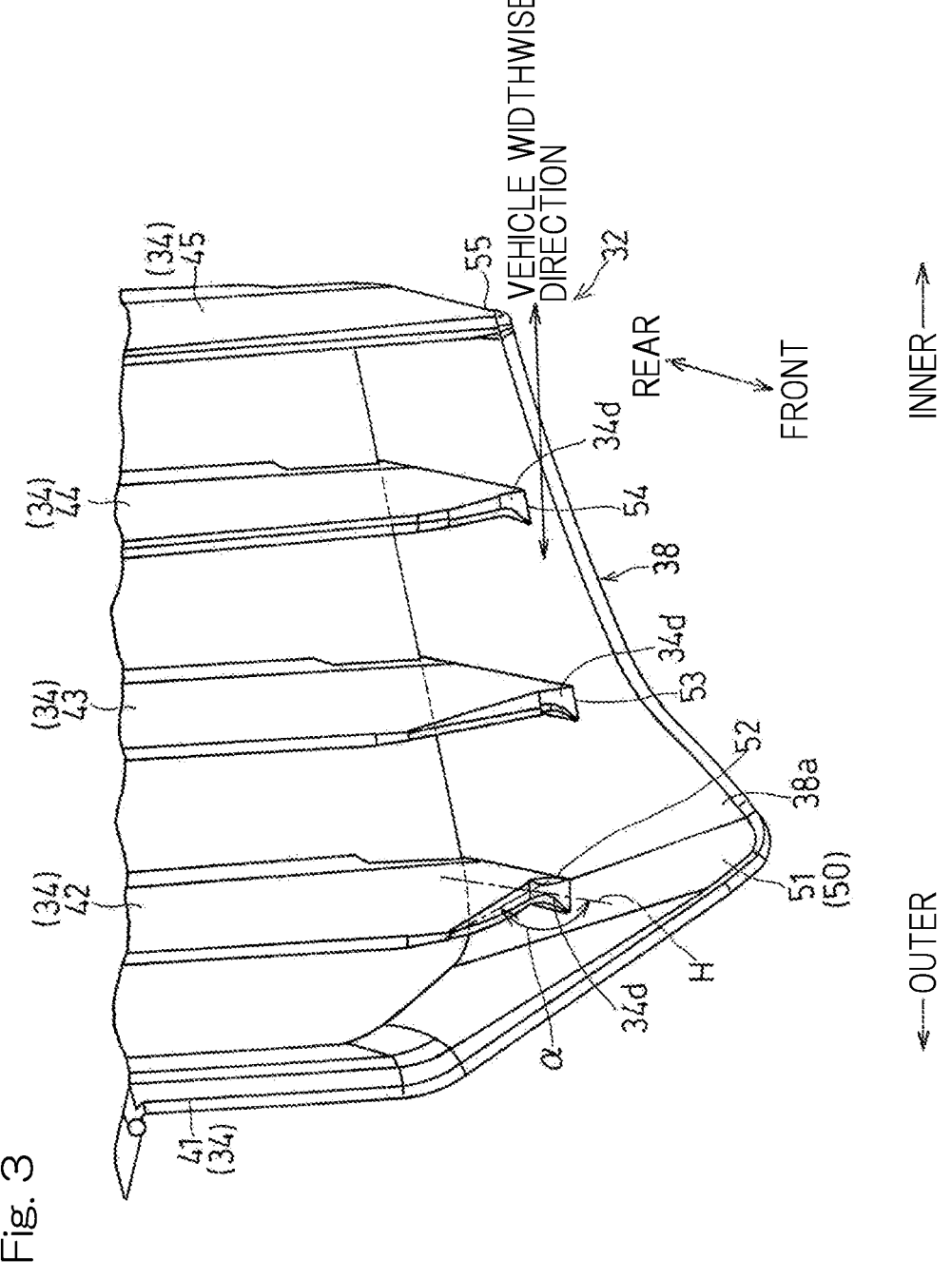
FIG. 3 is a perspective view showing a lower end portion of the screen in an enlarged manner.
Figure 4:
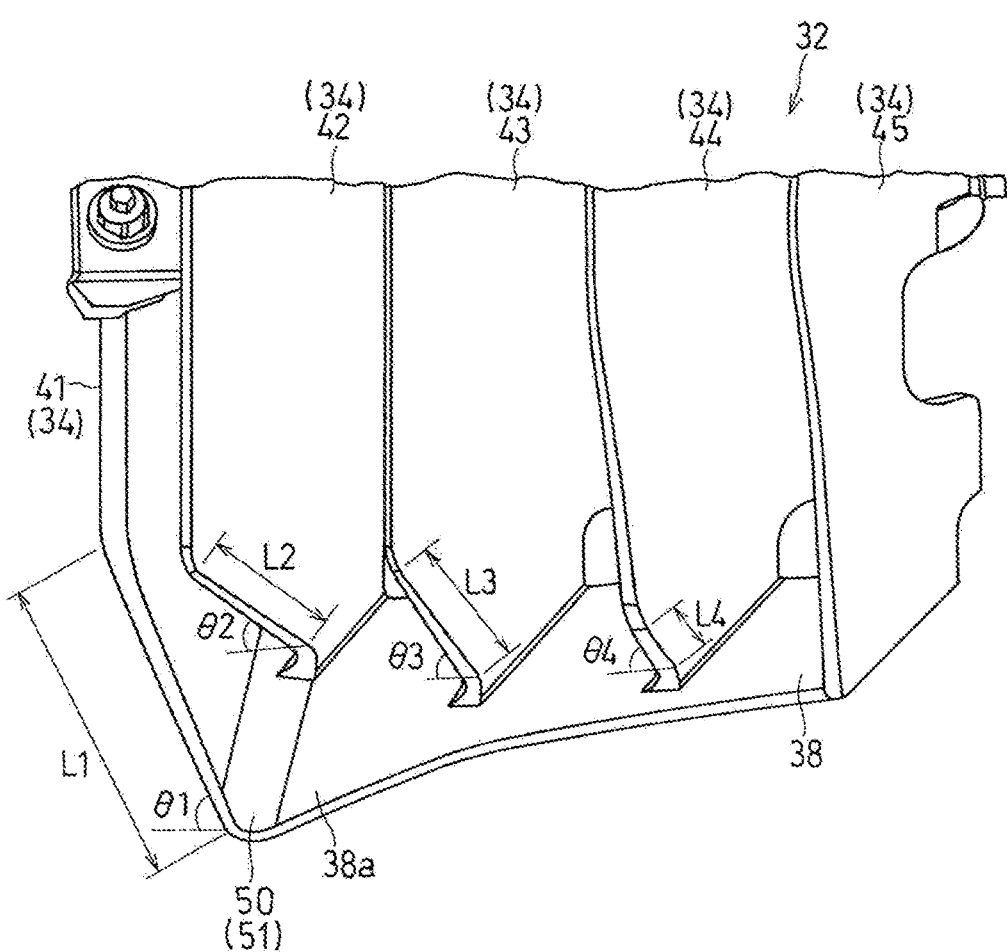
FIG. 4 is a front view showing the lower end portion of the screen in an enlarged manner.

Referring to FIG. 3 and FIG. 4, the structure of the connecting parts between the vertical fins 34 and the lower fin 38 is described. FIG. 3 is a perspective view showing the lower portion of the screen 32 on the right side in an enlarged manner, and FIG. 4 is a front view showing the lower portion of the screen 32 on the right side in an enlarged manner. In the following description, the first connecting part 51 refers to the connecting part which connects the first vertical fin 41 and the lower tin 38; the second connecting part 52 refers to the connecting part which connects the second vertical fin 42 and the lower fin 38; the third connecting part 53 refers to the connecting part which connects the third vertical fin 43 and the lower fin 38; the fourth connecting part 54 refers to the connecting part which connects the fourth vertical fin 44 and the lower fin 38; and the fifth connecting part 55 refers to the connecting part which connects the fifth vertical fin 45 and the lower fin 38.

As shown in FIG. 3, the lower ends 34$d$ of the vertical fins 34 have thicknesses larger than those of the rest parts of the vertical fins 34. In the present embodiment, the lower end portions 34$u$ of the second to fourth vertical fins 42, 43, 44 excluding the first and fifth vertical fins 41, 45 at the opposite ends have thicknesses larger than those of the rest parts of the vertical fins. Thus, the second to fourth connecting part 52, 53, 54 are reinforced.

In the present embodiment, the second connecting part 52 which connects the second vertical fin 42 and the lower fin 38 is located rearward with respect to the first connecting part 51 which connects the first vertical tin 41 and the lower fin 38. The second connecting part 52 which connects the second vertical fin 42 and the lower fin 38 is located rearward with respect to the third connecting part 53 which connects the third vertical fin 43 and the lower fin 38. The third connecting part 53 is located rearward with respect to the first connecting part 51. The third to fifth connecting parts 53, 54, 55 are located at the same position in the front-to-rear direction. However, the positional relation between the first to fifth connecting parts 51 to 55 is not limited to that in this example.

The front edges of the lower portions of the vertical fins 34 are inclined outward in the vehicle widthwise direction as they extend upward. In the present embodiment, the front edges of the lower portions of the first to fourth vertical fins 41 to 44 are inclined outward in the vehicle widthwise direction, while the front edge of the lower portion of the fifth vertical fin 45 is not inclined outward in the vehicle widthwise direction. As long as at least the front edge of the lower portion of the first vertical fin 41 is inclined outward in the vehicle widthwise direction as it extends upward or, in other words, is inclined inward in the vehicle widthwise direction as it extends downward, the lower portions of other vertical fins 34 may or may not be inclined in the vehicle widthwise direction.

As shown in FIG. 4, the respective inclined parts of the front edges of the vertical fins 34 have different lengths L in the extension directions and different inclination angles θ with respect to the lower fin 38. As used herein, the lengths in the extension directions of the inclined parts of the first to fourth vertical fins 41 to 44 are denoted as L1, L2, L3, and L4, respectively, and the inclination angles of the inclined parts of the first to fourth vertical fins 41 to 44 with respect to the lower fin 38 are denoted as θ1, θ2, θ3, and θ4, respectively. An inclination angle θ is an angle of the front edge of a vertical fin 34 with respect to a horizontal line extending in the vehicle widthwise direction in a front view.

In the present embodiment, the first vertical fin 41 has a largest length L of the inclined part in the extension direction, the third vertical fin 43 has a second largest length L, and the fourth vertical fin 44 has a smallest length L (L1 >L3>L2>L4). On the other hand, the first vertical fin 41 has a largest inclination angle θ, the second vertical fin 42 has a smallest inclination angle θ, and the third and fourth vertical fin 43, 44 have substantially same inclination angles θ (θ1>θ3≈θ4>θ2). However, the magnitude relations of the lengths L in the extension directions and the inclination angles θ are not limited to these of the present example.

According to the above-described configuration, the lower fin 38 is inclined downward as the lower fin extends forward, and the lower portion of the first vertical fin 41, which extends in an inwardly inclined manner in vehicle widthwise direction as the first vertical fin extends to the lower end thereof, is connected to the outer end portion of the lower fin 38, which extends in a downwardly inclined manner in the vehicle widthwise direction as the lower fin extends to the outer end thereof, through the connecting part 50. Thus, the connecting part 50 has an increased size as compared with the size in a case where the lower portion of the first vertical fin 41 extending in the vertical direction is connected to the outer end portion of the lower fin 38 extending in the vehicle widthwise direction, at the right angle. As a result, the rigidity of the lower fin 38 can be increased, without increasing the thickness of the lower fin 38 or providing the lower fin 38 with ribs.

In particular, in the motorcycle of the present embodiment, the front fender 10 is located below the screen 32 as shown in FIG. 1, so that the screen 32 cannot be disposed at a lower position in order to secure clearance with respect to the front fender 10. That means, it is difficult to increase the thickness of the lower fin 38 of the screen 32 or to provide the lower fin 38 with ribs. Therefore, the structure according to the present disclosure is particularly advantageous in that the structure can increase the rigidity of the lower fin 38 without increasing the thickness or providing ribs as described above.

In addition, the lower fin 38 enhances the incoming-air guiding effect. Since the outer portion of the front edge part of the lower fin 38 in the vehicle widthwise direction is inclined downward, incoming air can be easily introduced from the outer side in the vehicle widthwise direction, so that the wind introducing effect can be further enhanced. Even though the outer portion of the lower fin 38 in the vehicle widthwise direction extends downward, the connecting part 50 does not project outward in the vehicle widthwise direction because the outermost, first vertical fin 41 is inclined inward so that the connecting part 50 can be connected at the inner portion with respect to the upper portion of the vertical fin 41.

In particular, in the motorcycle of the present embodiment, the knee grip part KG is located on the outer side with respect to the radiator 30, and the connecting part 50 is located on the lower side with respect to the cowling 25 and is exposed to the outer lateral side as shown in FIG. 1. According to the above-described configuration, the connecting part 50 does not project outward in the vehicle widthwise direction, making it possible to prevent a leg of a driver from being caught on the screen 32.

As shown in FIG. 2, the second connecting part 52 which connects the second vertical fin 42 and the lower fin 38 is located rearward with respect to the first connecting part 51 which connects the first vertical fin 41 and the lower fin 38. Thus, foreign objects such as mud from the outer side in the vehicle widthwise direction is less likely to accumulate in the second connecting part 52, so that mud accumulation can be prevented in the entire screen 32. Further, the second connecting part 52 which connects the second vertical fin 42 and the lower fin 38 is located rearward with respect to the third connecting part 53 which connects the third vertical fin 43 and the lower fin 38. Thus, mud from the inner side in the vehicle widthwise direction is less likely to accumulate in the second connecting part, so that mud accumulation can be prevented further effectively in the entire screen 32.

The lower fin 38 extends forward as it extends to the outer end thereof in the vehicle widthwise direction. Thus, the lower fin 38 has an increased size, so that entry of foreign objects can be prevented, and the wind introducing effect is enhanced as well. In addition, the connecting part 50 which connects the first vertical fin 41 and the lower fin 38 is made larger in the front-to-rear direction, so that the rigidity of the lower fin 38 is increased.

The lower ends 34d of the vertical fins 34 have thicknesses larger than those of the rest parts of the vertical fins 34. Thus, the lower end 34u of the vertical fins 34, i.e., the connecting parts 52 to 54 between the vertical fins 34 and the lower fin 38 are reinforced. This makes it possible to increase the rigidity of the lower fin 38.

The front edges of the lower portions of the vertical fins 34 are inclined rearward as they extend downward. Thus, mud is less likely to accumulate in the connecting parts 52 to 54 between the vertical fins 34 and the lower fin 38.

The front edges of the lower portions of the vertical fins 34 are inclined outward in the vehicle widthwise direction as they extend upward, and the inclined parts of the front edges of the vertical fins 34 have different lengths L in the extension directions and different inclination angles θ with respect to the lower fin 38 among the vertical fins 34. Thus, the shape of the lower inclined parts of the vertical fins 34 can be designed depending on the positions of the vertical fins 34. Specifically, the inclined parts in positions where they are greatly affected by mud may be shaped in such a form that less mud accumulates, whereas the inclined parts in positions where they are less affected by mud may be shaped in such a form that incoming air can easily pass through. This makes it possible to achieve the wind introducing effect and the foreign-object entry preventing effect.

The present disclosure is not limited to the above-described embodiments, and various additions, modifications, or deletions may be made without departing from the scope of the present disclosure. For example, the screen according to the present disclosure can also be applied to saddle riding vehicle other than motorcycles, such as three-wheelers and four-wheeled buggies. Accordingly, such variants are included within the scope of the present disclosure.

What is claimed is:

1. A screen which is attached to a saddle riding vehicle at such a position that the screen faces forward with respect to the saddle riding vehicle, and permits passage of incoming air while preventing passage of foreign objects, the screen comprising:

a plurality of vertical fins extending in a vertical direction and arranged next to one another in a vehicle widthwise direction, and a lower fin connecting lower ends of the vertical fins and inclined downward as the lower fin extends forward, wherein a first vertical fin, which is located in an outermost position in the vehicle widthwise direction in an attached state of the screen to a vehicle body, has a lower portion extending in an inwardly inclined manner in the vehicle widthwise direction as the lower portion extends to a lower end of the first vertical fin, a front end portion of the lower fin extending in a downwardly inclined manner as the front end portion extends from an inner end of the lower fin to an outer end of the lower fin in the vehicle widthwise direction, and the lower end of the first vertical fin and the outer end of the lower fin are connected by a connecting part.

2. The screen as claimed in claim 1, wherein the lower fin extends forward as the lower fin extends from an inner end to an outer end of the lower fin in the vehicle widthwise direction.

3. The screen as claimed in claim 1, wherein lower ends of the vertical fins have thicknesses larger than those of rest parts of the vertical fins.

4. The screen as claimed in claim 1, wherein front edges of lower portions of the vertical fins are inclined rearward as the front edges extend downward.

5. The screen as claimed in claim 1, wherein front edges of lower portions of the vertical fins are inclined outward in the vehicle widthwise direction as the front edges extend upward.

6. The screen as claimed in claim 5, wherein inclined parts of the front edges of the vertical fins have different lengths in extension directions and different inclination angles with respect to the lower fin among the vertical fins.

7. A motorcycle comprising:
the screen as claimed in claim 1,
an engine which is a drive power source, and
a radiator disposed forward of the engine and rearward of a front wheel,
wherein the screen is disposed forward of the radiator.

8. The motorcycle as claimed in claim 7, further comprising knee grip parts disposed outer lateral sides with respect to the radiator to be held between knees of a driver.

9. The screen as claimed in claim 1, wherein the lower end of the first vertical fin and the outer end of the lower fin are connected at the connection part such that an outer lower end of the screen extends lower than an inner lower end of the screen.

10. The screen as claimed in claim 1, wherein the plurality of vertical fins, the lower fin, and the first vertical fin are integrally formed.

11. A screen which is attached to a saddle riding vehicle at such a position that the screen faces forward with respect to the saddle riding vehicle, and permits passage of incoming air while preventing passage of foreign objects, the screen comprising:
a plurality of vertical fins extending in a vertical direction and arranged next to one another in a vehicle widthwise direction, and
a lower fin connecting lower ends of the vertical fins and inclined downward as the lower fin extends forward, wherein
a first vertical fin which is located in an outermost position in the vehicle widthwise direction in an attached state of the screen to a vehicle body has a lower portion extending in an inwardly inclined manner in the vehicle widthwise direction as the lower portion extends to a lower end of the first vertical fin,
a front end portion of the lower fin extending in a downwardly inclined manner as the front end portion extends from an inner end of the lower fin to an outer end of the lower fin in the vehicle widthwise direction,
the lower end of the first vertical fin and the outer end of the lower fin are connected by a connecting part, and
a second connecting part which connects the lower fin and a second vertical fin next to the first vertical fin on an inner side in the vehicle widthwise direction is located rearward with respect to a first connecting part which connects the lower fin and the first vertical fin.

12. A screen which is attached to a saddle riding vehicle at such a position that the screen faces forward with respect to the saddle riding vehicle, and permits passage of incoming air while preventing passage of foreign objects, the screen comprising:
a plurality of vertical fins extending in a vertical direction and arranged next to one another in a vehicle widthwise direction, and
a lower fin connecting lower ends of the vertical fins and inclined downward as the lower fin extends forward, wherein
a first vertical fin which is located in an outermost position in the vehicle widthwise direction in an attached state of the screen to a vehicle body has a lower portion extending in an inwardly inclined manner in the vehicle widthwise direction as the lower portion extends to a lower end of the first vertical fin,
a front end portion of the lower fin extending in a downwardly inclined manner as the front end portion extends from an inner end of the lower fin to an outer end of the lower fin in the vehicle widthwise direction,
the lower end of the first vertical fin and the outer end of the lower fin are connected by a connecting part, and
a second connecting part which connects the lower fin and a second vertical fin next to the first vertical fin on an inner side in the vehicle widthwise direction is located rearward with respect to a third connecting part which connects the lower fin and a third vertical fin next to the second vertical fin on an inner side in the vehicle widthwise direction.

\* \* \* \* \*